(12) United States Patent
Bianchi et al.

(10) Patent No.: US 8,062,806 B2
(45) Date of Patent: Nov. 22, 2011

(54) SEALED FUEL CELL STACK

(75) Inventors: Luc Bianchi, Artannes (FR); David Guenadou, Tours (FR); Laure Cornilleau, Joue les Tours (FR); Séchel Methout, Tours (FR)

(73) Assignee: Commissariat a l'Energie Atomique (FR)

( * ) Notice: Subject to any disclaimer, the term of this patent is extended or adjusted under 35 U.S.C. 154(b) by 713 days.

(21) Appl. No.: 12/066,861

(22) PCT Filed: Oct. 9, 2006

(86) PCT No.: PCT/EP2006/067209
§ 371 (c)(1),
(2), (4) Date: Mar. 14, 2008

(87) PCT Pub. No.: WO2007/042503
PCT Pub. Date: Apr. 19, 2007

(65) Prior Publication Data
US 2008/0268325 A1    Oct. 30, 2008

(30) Foreign Application Priority Data
Oct. 11, 2005    (FR) ..................................... 05 53093

(51) Int. Cl.
*H01M 2/38*    (2006.01)
*H01M 2/40*    (2006.01)
*H01M 8/24*    (2006.01)

(52) U.S. Cl. ......... 429/508; 429/458; 429/459; 429/460

(58) Field of Classification Search ................... 429/508, 429/511, 458, 460, 459
See application file for complete search history.

(56) References Cited

U.S. PATENT DOCUMENTS
5,750,278 A * 5/1998 Gillett et al. .................. 429/436
6,096,452 A * 8/2000 Gilabert et al. ............... 429/151

OTHER PUBLICATIONS
English Translation of International Preliminary Examination Report, PCT/IPEA/338, Oct. 2008.
DE101 24 863; Luc Bianchi.

* cited by examiner

*Primary Examiner* — Patrick Joseph Ryan
*Assistant Examiner* — Julian Anthony
(74) *Attorney, Agent, or Firm* — Baker & Hostetler LLP

(57) ABSTRACT

The invention relates to a fuel cell consisting of a stack of elementary cells and interconnectors (7) and comprising a single vertical seal (2) which is placed around the stack thus formed. The aforementioned assembly is preferably equipped with a containment tube (1) which is placed around the vertical seal (2). Supply channels (11 and 12) in the interconnectors and lateral inlet and outlet (13 and 14) holes can be used to supply distribution channels (9 and 10) which are positioned against the electrodes of each elementary cell. The invention is suitable for SOFC-type fuel cells.

6 Claims, 10 Drawing Sheets

SEALED FUEL CELL STACK

FIELD OF THE INVENTION

Figure 1:
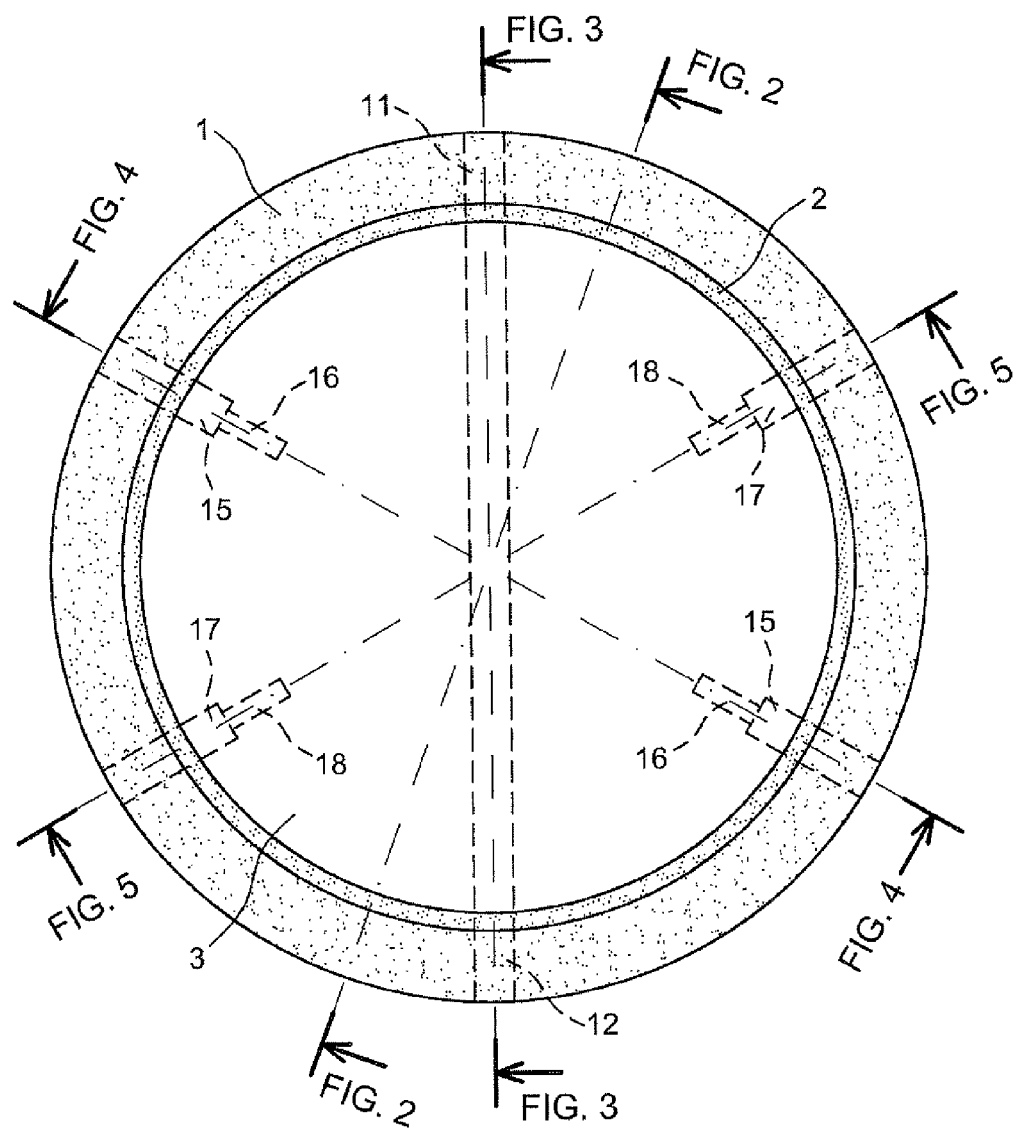

The invention concerns fuel cells, in particular those operating at high temperature and of the SOFC (Solid Oxide Fuel Cell) type, in other words solid electrolyte fuel cells.

PRIOR ART AND PROBLEM POSED

SOFC type fuel cells operate with a first reactive element, which is a fuel, such as hydrogen, which electrochemically reacts with a second reagent, an oxidant such as oxygen, to produce a continuous electrical current and heat. The operating temperatures are then comprised between 500 and 1000° C. A cell of this type of fuel cell is constituted of two porous and electronically conductive electrodes, namely an anode and a cathode separated by an electronically isolating, but ionic conductor, electrolyte. The anode generally comprises an element, known as "cermet", a combination of a ceramic and a metal, of the nickel-zirconia type, whereas the cathode may be constituted of doped lanthanum manganite. The most widely used material constituting the electrolyte is zirconia doped with yttria.

In such a type of fuel cell, oxygen reacts at the cathode with electrons to form oxide ions that migrate through the electrolyte, up to the anode. The fuel (hydrogen) injected at the anode reacts with the oxide ions to form water and electrons that circulate from the anode to the cathode while flowing through an external electrical circuit.

However, each fuel cell elementary cell, composed of an anode, an electrolyte and a cathode, produces a potential difference generally not exceeding one volt. To attain higher potential differences, which facilitate the conversion of power of the electrical energy thereby produced downstream of the fuel cell, several of these cells are electrically connected in series and grouped together into stacks. Such a stack of cells is therefore constituted of several cells separated by bipolar wafers, also known as "interconnectors". Such an interconnector is therefore electronic conductor and is arranged between the anode and the cathode of two adjacent cells. It enables the electrical current produced to be collected, and in certain cases to distribute the gases to the electrodes, or even to collect the unused reaction products and gases at the outlet. Thus, a stack of several elementary cells enables a fuel cell to be constituted.

One of the main problems of these stacks is the sealing. Indeed, to assure the correct operation of a fuel cell consisting of such a stack, it is necessary to separate perfectly the reagents, both at the level of the distribution and at the level of the elementary cells. The range of materials that can fulfil this function at high temperature, namely 500 to 1000° C., is very limited, due to the constraints imposed by the diversity of materials comprising such a type of fuel cell (SOFC). The separation of the gases is all the more difficult to obtain given that an electrical contact has to be assured between the different elementary cells and their respective connector or interconnector.

At present, few materials are able to meet the requirements of this type of fuel cell (SOFC), especially by considering this condition of sealing. Numerous patents propose ingenious solutions for distribution of oxidant gas and fuel, or flexibility of the stacks, but do not propose overall sealing solutions for a fuel cell consisting of such a stack.

Patent WO-02/17 419 A2 may for example be cited, which describes an architecture without sealing, but for which it is impossible to recover the unused gases that burn in the periphery of the battery.

U.S. Pat. No. 6,051,330 describes a sealing of elementary cells by localised densification of the porous electrodes and by compression of certain zones before sintering. This technique, also efficient, does not enable all eventualities to be resolved and other sealing modes are necessary for such a fuel cell to work correctly.

Finally, U.S. Pat. No. 6,045,935 describes a system using mica seals to achieve the sealing of the fuel and oxidant gases distribution circuit, which is remote from the hot zones of the stack and by using a mechanical pressure for the inflows of oxidant and fuel gases into the stack. The sealing at the level of the elementary cells is not dealt with, but it is specified that certain leaks are tolerated during the operation of such a type of fuel cell.

The aim of the invention is therefore to propose a type of stack of fuel cells equipped with an efficient sealing system having no interferences with the system for electrically interconnecting the elementary cells.

RÉSUMÉ OF THE INVENTION

To this end, a first principal subject of the invention is a solid oxide type fuel cell constituted by a stack of electrode/electrolyte/electrode type elementary cells, arranged alternately with interconnectors.

According to the invention, a single, closed, vertical seal is used, surrounding the stack. Thus, the sealing of the interior of the circuit of each base cell is achieved vis-à-vis the exterior. Moreover, the overall sealing of the system is assured by using a single seal, which, due to its positioning and its architecture, makes it possible to assure simultaneously the sealing at the level of the gas supply and gas recovery networks and between the different cells of the stack. In addition, the continuity between the electrical connections of the electrodes is not interrupted by any seals placed between the elements of the stack. This constitutes an important element of the invention.

With the aim of protecting this assembly, it is preferable to use a containment tube placed around the seal.

In a preferential embodiment of the invention, lateral passage holes may be arranged in the single seal. Inlet and outlet holes may be arranged in any containment tube to achieve the distribution and the release of the fuel and oxidant gases.

A specific embodiment of the containment tube consists in only providing for a shape known as open, in other words of a snail shaped section, the vertical seal also being of a corresponding section with a progressive diameter along its perimeter, and equipped with an extending lip at the level of an overlap of two ends of the containment tube then being positioned at different radii.

A second principal subject of the invention is a solid oxide type fuel cell (SOFC) consisting of a stack of electrode/electrolyte/electrode elementary cells arranged alternately with interconnectors, and equipped with at least two fuel gas and oxidising gas supply tubes inside the stack.

According to the invention, for each supply tube placed inside the stack, a single vertical seal closed around each supply tube is used, the release of the gases taking place via the whole external surface of the stack.

LIST OF FIGURES

Figure 2:
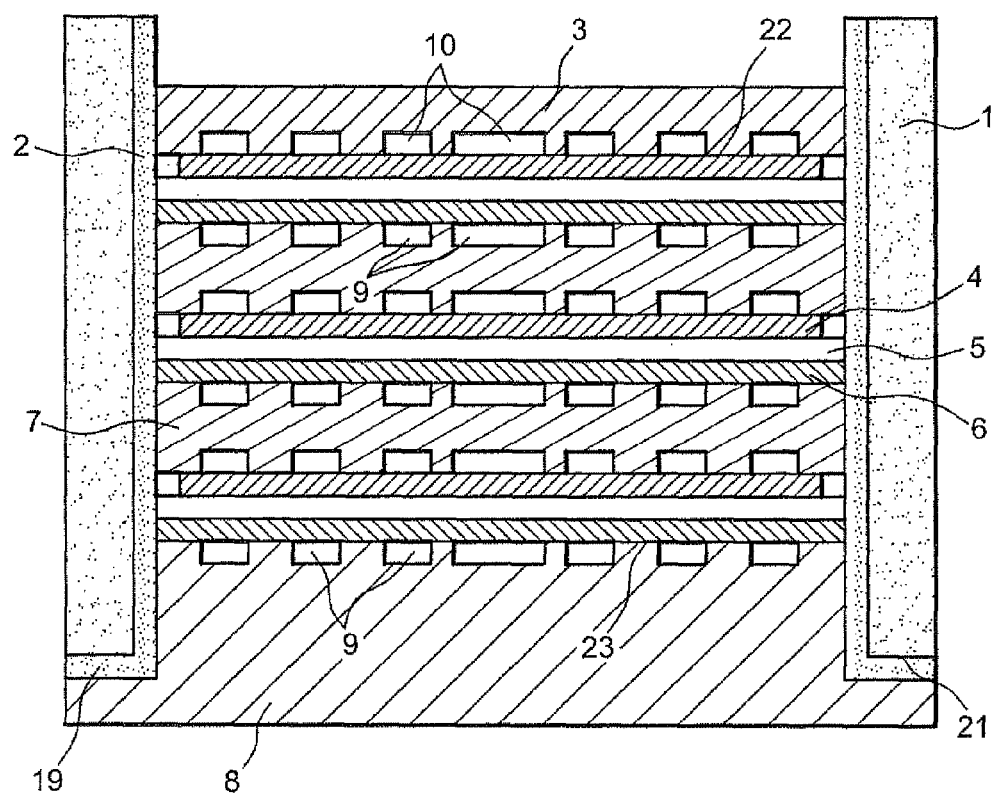
Figure 3:
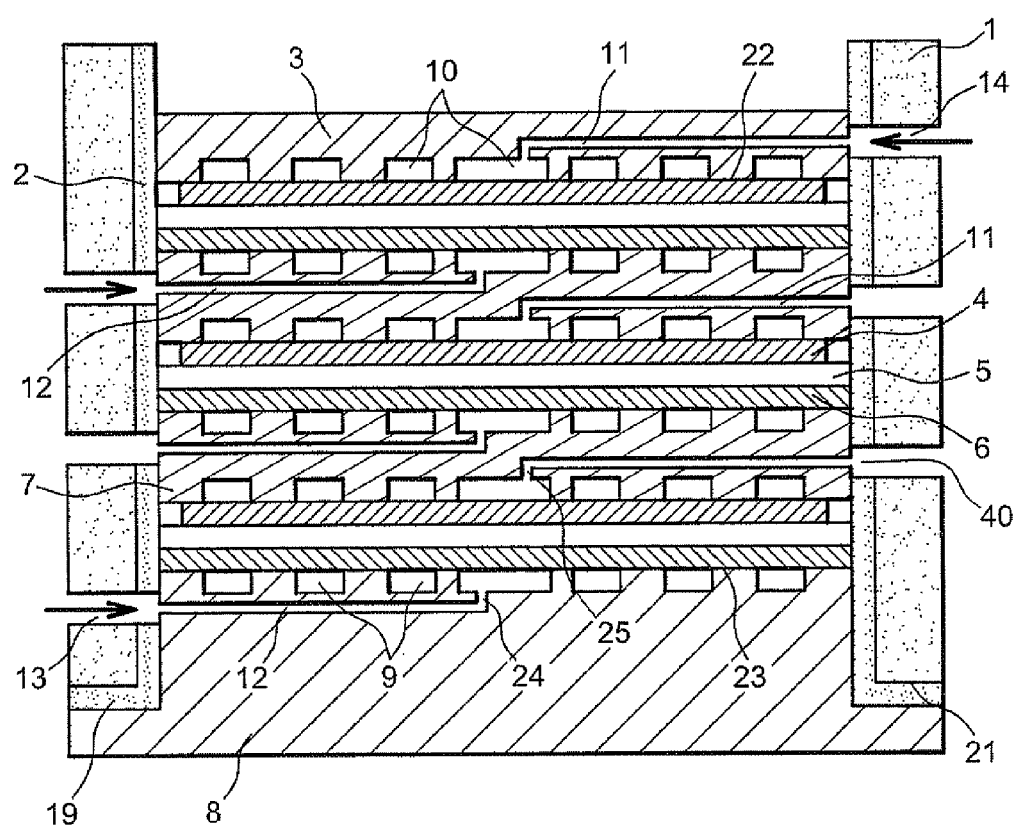
Figure 4:
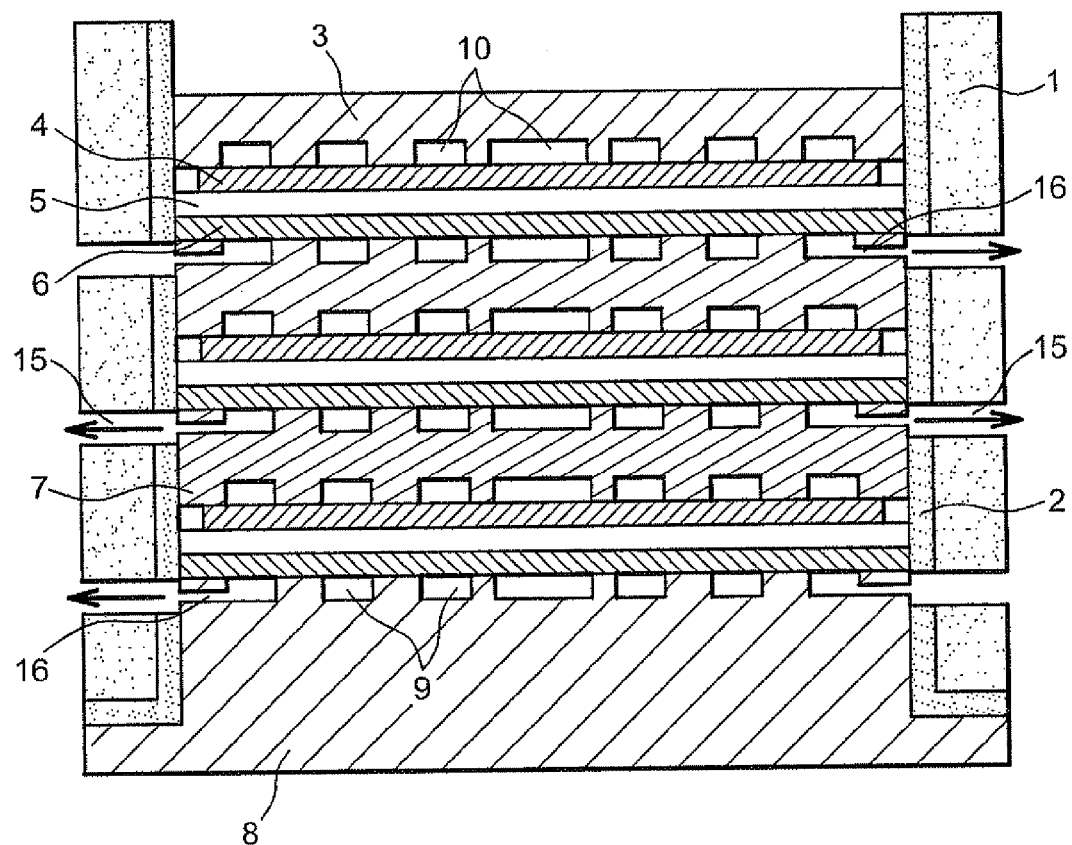
Figure 5:
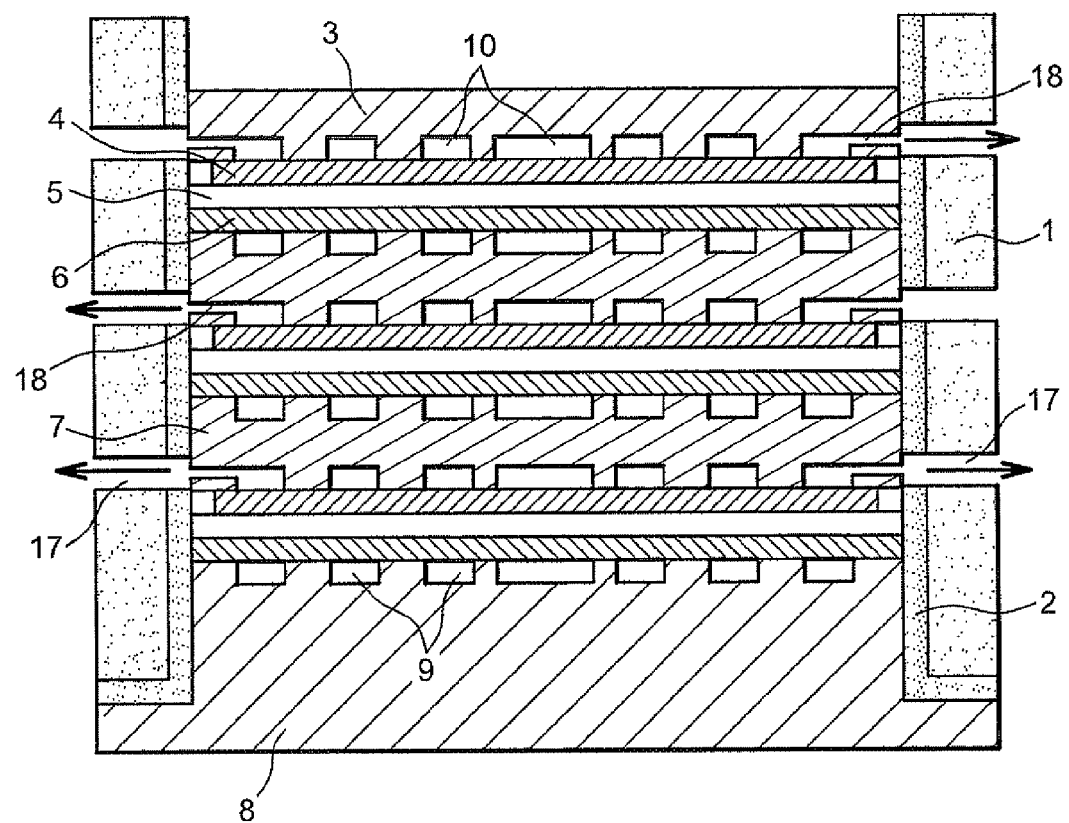
Figure 6:
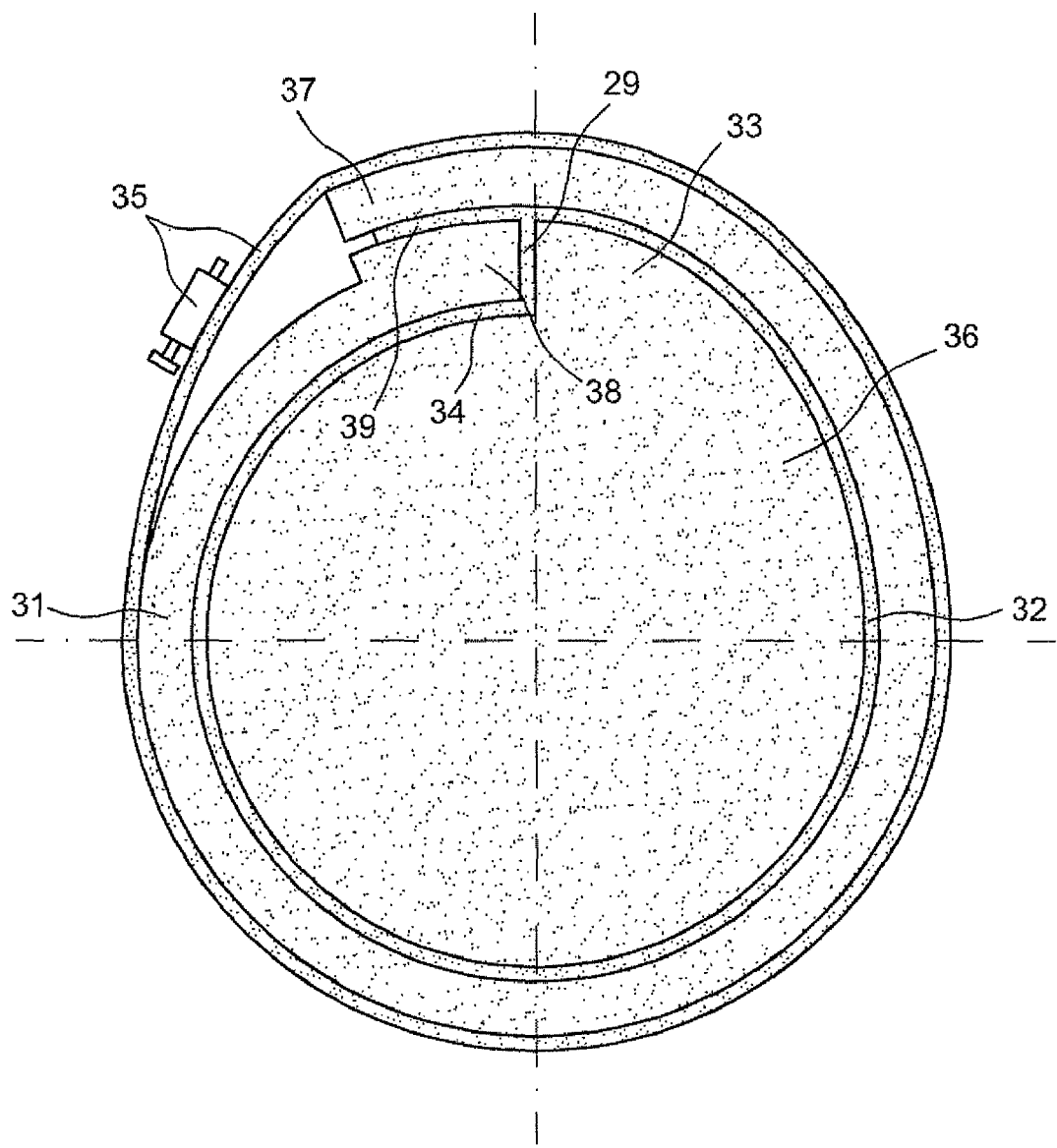
Figure 7:
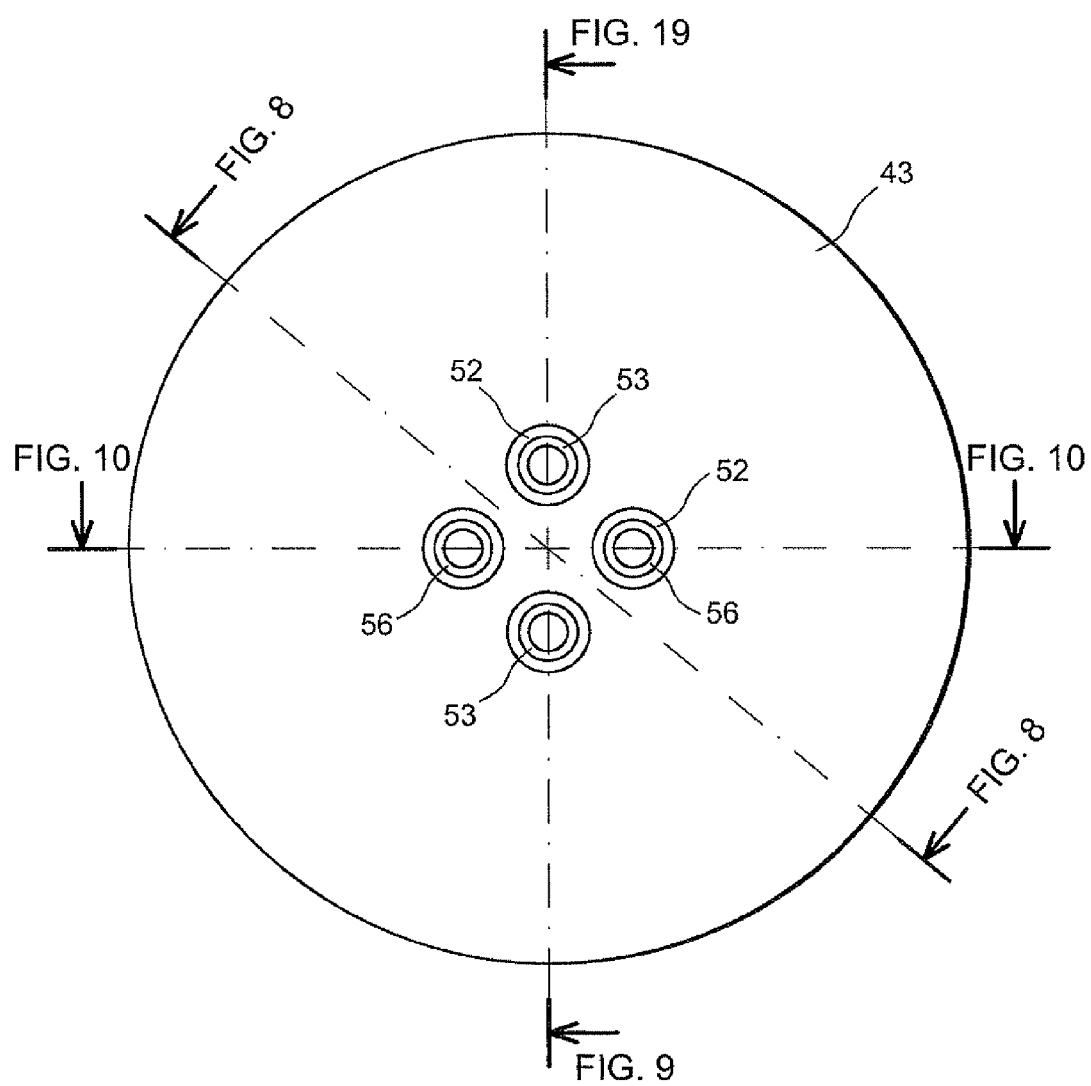
Figure 8:
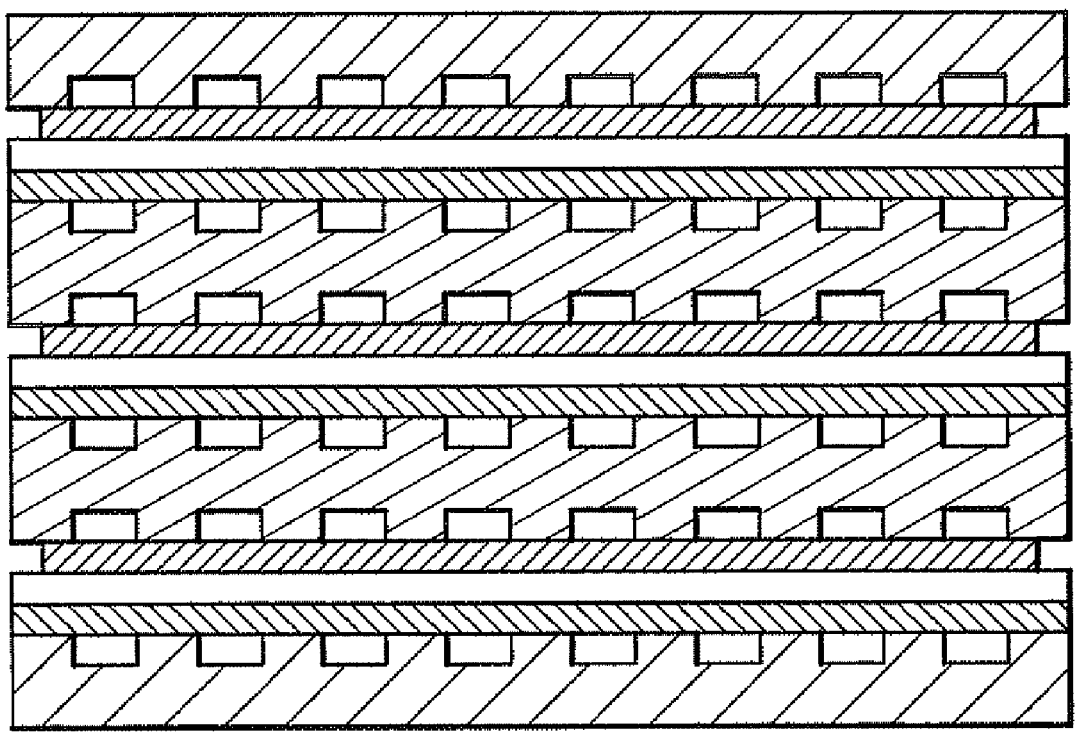
Figure 9:
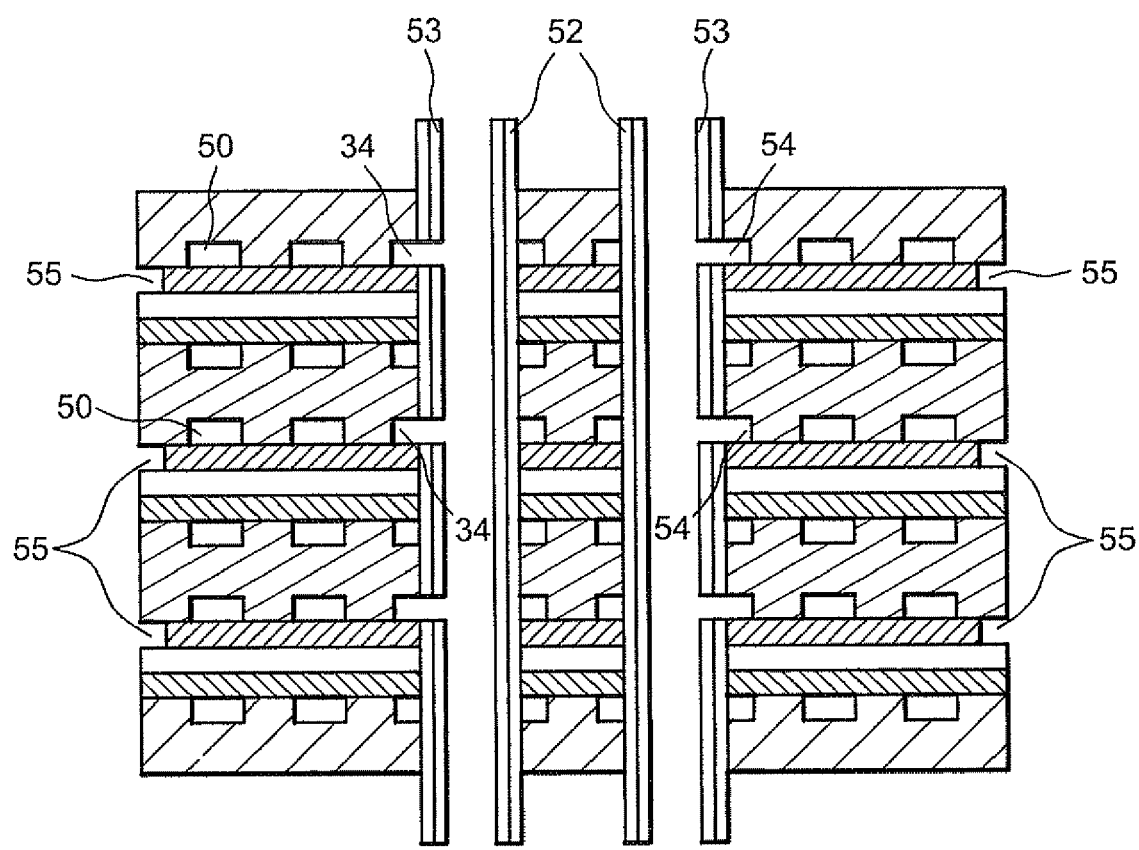
Figure 10:
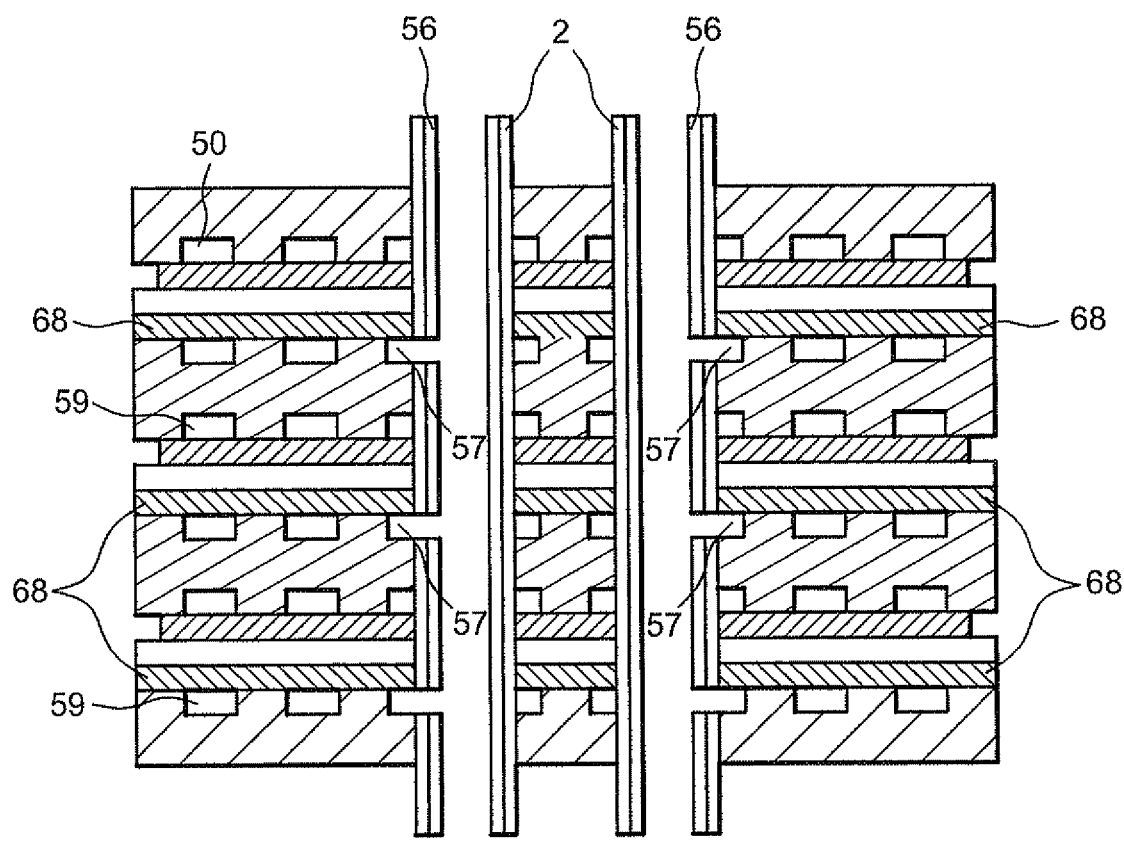

The invention and its different technical characteristics will be more fully understood on reading the description, and by referring to several figures representing respectively:

FIG. 1, a top view of the section of the fuel cell according to a first embodiment with section lines relative to the following figures;

FIG. 2, a first frontal section of the first embodiment of the invention;

FIG. 3, a second frontal section according to a second angle of the first embodiment of the invention;

FIG. 4, a third frontal section according to a third angle of the first embodiment according to the invention;

FIG. 5, a fourth frontal section according to a fourth angle of this first embodiment of the invention;

FIG. 6, a transverse section of an alternative of the first embodiment of the invention;

FIG. 7, a top view of a second embodiment of the invention with indications of section lines concerning the following figures;

FIG. 8, a first frontal section of the second embodiment of the invention;

FIG. 9, a second frontal section of the second embodiment of the invention;

FIG. 10, a third frontal section of the second embodiment of the invention.

DETAILED DESCRIPTION OF TWO EMBODIMENTS OF THE INVENTION

FIG. 1 shows, in top view, a fuel cell according to the invention consisting of a stack of elementary cells stacked in a closed containment tube 1. The stack is closed by a closing cathodic diffuser 3 which is in fact one of two end interconnectors. It is isolated from the containment tube 1 by a vertical seal 2. In fact, said seal 2 is positioned between the external wall of the stack and the internal wall of the containment tube 1 placed around the stack. From a practical point of view, the seal 2 may be either deposited by a suitable method, such as thermal sputtering, for example, directly on the interior wall of the containment tube 1, or instead if it is self-structuring, it may be put in place between the two elements, during assembly.

In this FIG. 1 are represented the different section planes of FIGS. 2, 3, 4 and 5 by axes marked by numbers corresponding to the figure concerned. Compared to the section plane of FIG. 2, the section plane of FIG. 3 is offset angularly by 20° from a first side, whereas the section plane relative to FIG. 4 is offset by an angle of 90° from the same side. Furthermore, the section plane of FIG. 5 is offset by 40° from the other side.

The presence, in dotted lines, of two supply channels 11 and 12 may be noted, each having the length of a radius and directed towards the centre.

Also represented in dotted lines are two fuel outlets 15, diametrically opposite in the plane of FIG. 4. In the same way, two oxidising gas outlets 17 are represented, diametrically opposite in the plane of FIG. 5.

FIG. 2 therefore shows, according to a first frontal section, a first embodiment of a fuel cell according to the invention. Three elementary cells have been represented in this stack, but this number is not set, since such a stack of elementary cells may comprise any number of base cells. Each elementary cell comprises at least one cathode 4, one electrolyte 5 and one anode 6 placed in this order, one against the other. The geometry of these elementary cells is not limited to that of flat cells of cylindrical or prismatic section, three dimensional cells may be envisaged, for example in the shape of a waffle iron, corrugated, or reinforced by ribs, as with any other geometries.

These three elementary cells are intercalated with interconnectors (or bipolar wafers) 7. A closing cathodic diffuser 3 closes the stack in its upper part, in the same way that an anodic diffuser support 8 is in its lower part. The stack is maintained in its position by the containment tube 1 that surrounds the assembly over its whole height, except at the level of a lower shoulder 19 of the anodic diffuser support 8. Between the stack of elementary cells and interconnectors 7 and the containment tube 1, there is a single vertical seal 2 that opens into the upper part of the stack as at the exterior of the circumference by a lower base 21 perpendicular to the rest of the vertical seal 2, between the lower part of the containment tube 1 and the shoulder 19 of the anodic diffuser support 8.

Each interconnector 7, just like the anodic diffuser support 8 and the closing cathodic diffuser 3, has oxidant and fuel distribution channels 10. The anode 6 of the first elementary cell is arranged against the anodic electrical contacts 23 of the anodic diffuser support 8, in order to assure the transfer of electrons between the two elements. Cathodic electrical contacts 22 of each interconnector 7 are placed in contact with the cathode 4 of the aforementioned elementary cell. A second elementary cell and therefore arranged on the anodic contacts 23 of the following interconnector 7. The cathodic electrical contacts 22 of the closing cathodic diffuser 3 are placed on the cathode 4 of the final elementary cell of the stack and constitute the negative pole of the battery.

FIG. 3 shows, in frontal section, according to another diameter compared to FIG. 2, the inflow of the oxidant and the carburant, namely a fuel and an oxidising gas. This FIG. 3 shows three elementary cells, with their three constituent elements, namely a cathode 4, an electrolyte 5 and an anode 6, but also two interconnectors 7, the anodic diffuser support 8 supporting the assembly and the closing cathodic diffuser 3 on the upper part. Said diffuser has an air supply channel 11 opening into the distribution channels 10. In the same way, the anodic diffuser support 8 has at least one oxygen supply channel 12 opening into the distribution channels 9. The same is true for interconnectors 7 having supply channels 11 and 12 each opening into the distribution channels 10 and 9.

The supply in gas of these different supply channels 11 and 12 takes place by means of several clearance holes such as inlet holes 13 and 14, respectively fuel and oxidising gas inlets, formed in the wall of the containment tube 1. Correspondingly, the vertical seal has a same number of corresponding clearance holes 40. Thus, the fuel is distributed in the supply inlets 13, then circulates in the fuel supply channels 12 to be injected into the central zone of the anodes 6.

This injection of fuel at the level of the anodes 6 is represented as being carried out at the centre for reasons of temperature homogeneity in the system, but this injection can take place at other locations. The face of the interconnectors 7 placed opposite the anodes 6 is constituted of an arrangement of gorges constituting the fuel distribution channel 9 and outgrowths constituting the anodic electrical contacts 23. Thus, the distribution of the fuel to the anodes 6 is achieved while at the same time assuring the electrical continuity of the stack. The fuel distribution channels 9 therefore form an interconnected network to spread out the gas fuel in a homogeneous manner over the whole surface of the anodes 6, from a unique fuel injection point 24, which is central.

In order to simplify the distribution of the fuel gas and the geometry of the anodic electrical contacts 23 on the anodic surface, it is possible to multiply the number of injection points 24. The geometric pattern, as well as the shape of the fuel distribution channels 9 are not set, any other type of geometry may be envisaged, such as, in particular, spirals, labyrinths, pads, and other shapes. A similar geometry is present on the face of the anodic diffuser support 8, opposite the anode 6 of the first elementary cell and is formed also of fuel distribution channels 9 and anodic electrical contacts 23. Once distributed in the fuel distribution channels 9, this can penetrate in the anodes 6 to be oxidised therein. These anodes 6 are porous so as to offer to the fuel a maximum exchange surface, in order to facilitate its oxidation.

This same FIG. 3 also shows the system for supplying the base cells in oxidising gas. Such an oxidising gas is distributed via oxidising gas inlets 14, then circulates in the oxidising gas supply channels 11, to be injected into the central zone of the cathodes 4. The injection of this oxidising gas at the level of the cathodes 4 is also represented so as to be carried out at the centre for the same reasons of temperature homogeneity in the system, but this injection may also be carried out at other locations.

The face of the interconnectors 7 placed opposite the cathodes 4 is the image of that placed opposite the anodes 6, namely a network of oxidising gas distribution channels 10 intermingled with cathodic electrical contacts 22. A similar geometry is present on the face of the closing cathodic diffusers 3, also formed of oxidising gas distribution channels 10, and cathodic electrical contacts 22. In the same way as for the fuel, the oxidising gas may be injected by one or several injection points 25 between the supply channelling 11 and the distribution channels 10. Once distributed in the distribution channels 10, the oxidising gas can thereby penetrate the cathodes 4 to be reduced therein. These cathodes 4 are porous, so as to offer, to the oxidising gas, a maximum exchange surface, in order to facilitate its reduction.

It is important to form the supply inlets 13 and 14 with a diameter greater than that of the supply channels 11 and 12, in order not to be hindered by machining and assembly tolerances and positioning defects during assembly. Moreover, this makes it possible to assure a minimal passage section for the gases, in the case of height difference between the axis of the supply inlets 13 and 14 in the containment tube 1 and the supply channels 11 and 12 of the internal stack. Any such height difference may indeed be due to the temperature expansion difference of the materials constituting the different elements of the fuel cell. It is also possible to do the opposite, namely piercing the supply inlets 13 and 14 to a diameter less than that of the supply channels 11 and 12.

FIG. 4 shows the fuel evacuation and recovery circuit in the first embodiment of the invention.

A part of the fuel, introduced as described previously relative to FIG. 3, which has not reacted at the anodes 6, is dispelled by the flow of fuel circulating in the distribution channels 9. To achieve this, the fuel distribution channels 9 terminate by one fuel outlet end 16 situated in the interconnectors 7 and one in the cathodic diffuser 3, in contact with the anode 6. Obviously, the vertical seal 2 is pierced in correspondence with the fuel outlets 15 formed in the containment tube 1.

In reference to FIG. 5, an excess oxidising gas recovery outlet is organised in the same way as the recovery of fuel described in the previous paragraphs. Here, the oxidising gas outlet 18 constitutes one outlet end of the oxidising gas distribution channels 10, these being placed against the cathodes 4. These distribution channels each have one oxidising gas outlet end 18 also found in the interconnectors 7 and an additional one in the closing cathodic diffuser 3. Oxidising gas outlets 17 are formed in the containment tube 1, in the same way as corresponding holes in the vertical seal 2.

Here again, it is important to form fuel outlets 15 (FIG. 4) and oxidising gas outlets 17 with a piercing diameter greater than that of the fuel outlet ends 16 and oxidising gas outlet ends 18, in order not to be hindered by machining tolerances and positioning defects, during assembly. Moreover, this makes it possible to assure a minimal passage section for the gases, in the case of height difference between the axis of the gas outlets 15 and 17 in the containment tube 1 and the gas outlet ends 16 and 18 of the internal stack. It will be recalled that such a height difference may be due to the differentials caused by the temperature expansion of the different materials constituting this stack.

In the same way as for the fuel, the inverse may also be envisaged, in other words gas outlet ends 16 and 18 with a section greater than that of the outlets 15 and 17 formed in the containment tube 1. In these FIGS. 1, 2, 3 and 4, the inlets and outlets for each gas have been represented as being two, but it is possible to use any number of inlets and outlets at the same time. In the same way, only a single inlet point of these gases has been represented at the level of the cells. For reasons of homogenisation of the flow of these gases, it is possible to multiply these inlet points.

An alternative of this first embodiment is represented by FIG. 6, in top view. It may be observed that the section of the stack is not symmetrical, just like the containment tube and the seal, but has a configuration known as "open". In fact, the containment tube 1 comprises a section having a progressive diameter, in other words of snail shape and covering itself at the level of these two ends 37 and 38. In the same way, the vertical seal 32 also has a section of progressive diameter, with one exterior end 39 covering one interior end 34 terminated radially by a radial extension 29 to join the exterior end 38.

Obviously, the shape of the parts or the elements found in the stack, such as the interconnectors, the closing cathodic diffuser, the anodic diffuser support and the electrolytes, have a shape adapted to that of the interior wall of the containment tube 31, as shown in this FIG. 6 for the closing cathodic diffuser 33. In order to avoid too high thermal gradients, it is preferable to keep a circular shape for the cathodes and the anodes. Moreover, the geometry represented in this FIG. 6 is in no way restrictive, other shapes of containment cubes may be envisaged. This is the principle of the open containment tube, which is to be retained.

Concerning the other operating points, the principle remains identical to the configurations described previously. Nevertheless, it is necessary to make sure that the inlet and outlet conduits of the gases remain, after expansion, placed opposite the supply and evacuation channels of these gases.

The advantage of such a geometry is to enable a radial expansion in addition to axial expansions.

Indeed, the tube can thereby adapt itself to the local diameter of the stack by sliding on itself, through the intermediary of the vertical seal 32, which is viscous at the operating temperature. The internal stack 36 placed at the interior of the containment tube 31, and comprising the interconnectors, the cells, the anodic diffuser support and the closing cathodic diffuser can expand in all directions. Moreover, the diameter of the stack may be controlled, the assembly of the base cells and interconnectors being easier. The sealing is assured at high temperature by a clamping effect, applied to the assembly, as a function of the expansions of said assembly, through the intermediary of a tightening system 35 placed around the containment tube 31.

The following figures are relative to a second embodiment, not using a single containment tube placed around the stack. This architecture has two oxidising gas supply tubes 53 and two fuel supply tubes 56. These four supply tubes 53 and 56 are each covered, on their external surface, by a single vertical seal 52. In this embodiment, four supply tubes are represented, this figure only constituting a non restrictive embodiment.

In this embodiment, the recovery of the unused gases is not provided for. Indeed, said gases burn at the periphery of the stack. The stack is thus formed of a similar stack of interconnectors, of base cells traversed by these supply tubes 53 and 56. The electrical continuity is assured by the contacts between the interconnectors, the elementary cells, the closing cathodic diffuser and the anodic diffuser support, as shown in the previous embodiment.

FIG. 8 is a frontal section going through the centre of the stack, at the level of the inflows of oxidising gases. It may be observed that no supply tube traverses the stack at its centre.

FIG. 9 is another frontal section of this stack passing through the oxidising gases supply tubes referenced 53 in FIG. 7. These distribute the oxidising gas to each level of the elementary cells by oxidising gas supply piercings 54, which open into oxidising gas distribution channels 50. Said channels are interconnected so as to enable a homogeneous distribution of the oxidising gas over the whole surface of the cathodes. The oxidising gas can then penetrate these porous electrodes to be reduced therein. The part of oxidising gas that has not reacted is evacuated by the flow conveying these gases, via oxidising gas outlet points 55.

FIG. 10 is an analogous figure showing the fuel supply tubes 56, that cross through the stack in an analogous manner to the oxidising gas supply tubes 53. In the same way, at each level of elementary cell, fuel supply piercings 57 are provided, opening into the fuel distribution channels 59. Said channels are interconnected to spread out in a homogeneous manner the oxidising gas over the whole surface of the anodes. The fuel may then penetrate said anodes, which are porous, to be oxidised therein. The part of the fuels not having reacted is evacuated by the flow of fuel gas, via fuel outlet points 68.

The principle of decoupling the sealing and the electrical contacts is therefore conserved in this type of architecture. This separation of the gases is thereby achieved by the several vertical seals 52 that manage to close the oxidising gas supply tubes 53 and the fuel supply tubes 56.

ADVANTAGES OF THE INVENTION

The architecture of such a fuel cell therefore makes it possible to achieve the sealing of the assembly of the battery in a different plane to that of the electrical continuity of the stack. The dimensional tolerance of one is then independent of that of the other and the contacts that it necessitates take place in different directions. This architecture therefore makes it possible not to be hindered by certain machining and assembly tolerances.

This architecture also has the advantage of sealing a fuel cell at the level of the supply, the recovery and the separation of the gases at the level of the elementary cells, with a single seal for all the stack in the first embodiment and four seals in the second embodiment.

This type of fuel cell has the advantage of enabling axial expansions of the assembly by sliding of the elementary cells, the interconnectors, the closing cathodic diffusers in the containment tube, by means of these vertical seals, which are viscous at the operating temperature. The radial expansions are absorbed geometrically by deformation of this or these vertical seal(s). The second embodiment also makes it possible to accommodate the radial expansions of elements of the stack.

The first embodiment has another advantage relative to the containment tube 1 that forms a hermetic chamber for the different elements constituting the stack. This makes it possible to arrange in a generator assembly several stacks in series and/or in parallel.

This structure of fuel cell has a relatively simple system for distributing or recovering the gases. Indeed, each gas may be introduced into the stack by a single point and be extracted by two points for the whole of the stack. This architectural concept enables inexpensive fuel cells to be constructed. Several stack shapes may be envisaged, in the same way as any size of fuel cell. Finally, this structure does not restrict the choice of materials used to constitute the different constituent elements of the stack.

The invention claimed is:

1. Solid oxide fuel cell (SOFC) comprising a plurality of electrode/electrolyte/electrode elementary cells, arranged in a stack disposed within a containment member having opposite ends, a plurality of interconnectors (7) separating the elementary cells within the containment member, and a single closed seal (2, 32) extending from one end of the containment member to the opposite end thereof surrounding the stack of elementary cells and interconnectors (7) wherein the containment member is in a configuration which is open comprising a section having a progressive diameter with a snail shaped geometry.

2. Fuel cell according to claim 1, characterised in that the containment member is a containment tube (1, 31), placed around the seal (2, 32) with the seal oriented in a vertical direction in substantial alignment with the containment tube.

3. Fuel cell according to claim 2, further comprising holes (40) laterally extending in the vertical seal (2, 32).

4. Fuel cell according to claim 2, further comprising inlet or outlet holes (11, 12, 14, 15, 17 and 18), extending through the containment tube (1, 31) to assure the distribution and the release of the gases.

5. Fuel cell according to claim 2, wherein the vertical seal (32) further comprises a section corresponding to the snail section in the containment tube with a progressive diameter along its perimeter and equipped with a radial extension lip (29) at the level of an overlap of two ends (37) and (38) of the containment tube (31) located at different diameters.

6. Fuel cell comprising a stack of electrode/membrane/electrode elementary cells, arranged alternately with interconnectors about a common axis and equipped with at least two fuel gas supply tubes (56) traversing the stack of elementary cells and interconnectors relative to said common axis and at least two oxidising gas supply tubes (53) traversing the stack of elementary cells and interconnectors respectively with each of said fuel gas and oxidizing gas supply tubes having an external surface characterized in that said fuel cell further comprises; a single seal (52) for each external surface of each of said four supply tubes (53,56) respectively with each seal (52) being oriented in substantial alignment with said common axis and having gas distribution channels in communication with each elementary cell such that the release of the gases takes place substantially homogeneously through the electrodes in the stack.

* * * * *